US011348126B2

(12) United States Patent
Sullivan et al.

(10) Patent No.: US 11,348,126 B2
(45) Date of Patent: May 31, 2022

(54) METHODS AND APPARATUS FOR CAMPAIGN MAPPING FOR TOTAL AUDIENCE MEASUREMENT

(71) Applicant: The Nielsen Company (US), LLC, New York, NY (US)

(72) Inventors: Jonathan Sullivan, Hurricane, UT (US); Logan Thomas, Sunnyvale, CA (US); Neung Soo Ha, Bethesda, MD (US); Luis Enrique Ordoñez, Mexico City (MX); Roger Guevara, Mexico City (MX)

(73) Assignee: The Nielsen Company (US), LLC, New York, NY (US)

( * ) Notice: Subject to any disclaimer, the term of this patent is extended or adjusted under 35 U.S.C. 154(b) by 10 days.

(21) Appl. No.: 16/230,680

(22) Filed: Dec. 21, 2018

(65) Prior Publication Data

US 2019/0220873 A1    Jul. 18, 2019

Related U.S. Application Data

(60) Provisional application No. 62/617,505, filed on Jan. 15, 2018.

(51) Int. Cl.
*G06Q 30/02* (2012.01)
*G06F 16/174* (2019.01)
(Continued)

(52) U.S. Cl.
CPC ..... *G06Q 30/0201* (2013.01); *G06F 16/1748* (2019.01); *G06F 16/48* (2019.01); *G06N 20/00* (2019.01); *H04N 21/25883* (2013.01)

(58) Field of Classification Search
CPC ............ G06Q 30/0201; G06Q 30/02; G06Q 30/0242; G06Q 30/0243; G06N 20/00;
(Continued)

(56) References Cited

U.S. PATENT DOCUMENTS 6,873,979 B2   3/2005  Fishman et al.
7,039,931 B2 * 5/2006  Whymark .............. G06Q 30/02
                                                                  348/E7.063
(Continued)

FOREIGN PATENT DOCUMENTS

WO       2019140263         7/2019

OTHER PUBLICATIONS

Wierenga-Berend_2008_Handbook of Marketing Decision Models_Springer_International Series in operations research and management science_pp. 87-100 (Year: 2008).*
(Continued)

*Primary Examiner* — Rutao Wu
*Assistant Examiner* — Stephen S Swartz
(74) *Attorney, Agent, or Firm* — Hanley, Flight & Zimmerman, LLC (57) ABSTRACT

Example methods and apparatus disclosed herein include campaign mapping for total audience measurement. An example apparatus includes a machine learning engine to predict sets of estimated duplication factors that represent duplicated media exposure across different possible combinations of media platforms for respective ones of a plurality of reference media campaigns, apply an input set of total exposure metrics associated with respective individual ones of the media platforms for a query media campaign to predict a first set of estimated duplication factors for the different possible combinations of media platforms for the query media campaign; identify a first one of the set of reference media campaigns to represent the query media campaign; and estimate a second set of estimated duplication factors for the query media campaign based on the set of estimated duplication factors for the first one of the set of reference media campaigns and the input set of total exposure metrics for the query media campaign.

22 Claims, 5 Drawing Sheets

(51) Int. Cl.
*G06N 20/00* (2019.01)
*H04N 21/258* (2011.01)
*G06F 16/48* (2019.01)

(58) Field of Classification Search
CPC ............. G06F 16/1748; G06F 16/48; H04N 21/25883; H04N 21/44222
See application file for complete search history.

(56) References Cited

U.S. PATENT DOCUMENTS

| | | | |
|---|---|---|---|
| 8,327,396 B2 * | 12/2012 | Ramaswamy | H04N 21/4126 725/19 |
| 8,364,516 B2 * | 1/2013 | Anderson | G06Q 30/0246 705/7.29 |
| 8,370,489 B2 * | 2/2013 | Mazumdar | H04L 67/42 709/224 |
| 8,411,085 B2 | 4/2013 | Rubin et al. | |
| 8,768,942 B2 | 7/2014 | Williamson | |
| 8,973,023 B1 * | 3/2015 | Rao | H04N 21/25891 725/14 |
| 9,122,694 B1 * | 9/2015 | Dukes | G06F 16/1748 |
| 9,355,383 B2 | 5/2016 | Williamson | |
| 2003/0093415 A1 * | 5/2003 | Larson | G06F 16/24535 |
| 2011/0288907 A1 * | 11/2011 | Harvey | G06Q 30/02 705/7.29 |
| 2014/0122703 A1 * | 5/2014 | Pugh | H04L 43/0876 709/224 |
| 2014/0278771 A1 * | 9/2014 | Rehman | G06Q 30/0201 705/7.31 |
| 2014/0280891 A1 | 9/2014 | Doe | |
| 2015/0186403 A1 * | 7/2015 | Srivastava | G06F 16/215 707/692 |
| 2016/0027037 A1 * | 1/2016 | Cai | G06Q 30/0243 705/14.42 |
| 2016/0076876 A1 | 3/2016 | Wainreb et al. | |
| 2016/0132940 A1 | 5/2016 | Frommann et al. | |
| 2016/0210661 A1 | 7/2016 | Chittilappilly et al. | |
| 2017/0034591 A1 * | 2/2017 | Ray | G06Q 30/0269 |
| 2017/0034592 A1 * | 2/2017 | Ray | H04N 21/4532 |
| 2017/0034593 A1 * | 2/2017 | Ray | H04N 21/812 |
| 2017/0053306 A1 | 2/2017 | Sissenich et al. | |
| 2017/0091810 A1 * | 3/2017 | McGovern | G06Q 30/0247 |
| 2017/0155956 A1 | 6/2017 | Nagaraja Rao et al. | |
| 2017/0188067 A1 | 6/2017 | Sullivan et al. | |
| 2017/0208370 A1 * | 7/2017 | Ray | G06Q 30/0264 |
| 2017/0323327 A1 | 11/2017 | Pachisia et al. | |

OTHER PUBLICATIONS

International Searching Authority, "Search Report," issued in connection with International Patent Application No. PCT/US2019/013303, dated May 2, 2019, 3 pages.

International Searching Authority, "Written Opinion," issued in connection with International Patent Application No. PCT/US2019/013303, dated May 2, 2019, 6 pages.

International Bureau of WIPO, "International Preliminary Report on Patentability," issued in connection with International Patent Application No. PCT/US2019/013303, dated Jul. 21, 2020, 7 pages.

* cited by examiner

FIG. 5

METHODS AND APPARATUS FOR CAMPAIGN MAPPING FOR TOTAL AUDIENCE MEASUREMENT

RELATED APPLICATION

This patent claims priority to U.S. Provisional Patent Application Ser. No. 62/617,505, filed on Jan. 15, 2018. U.S. Provisional Patent Application Ser. No. 62/617,505 is hereby incorporated herein by reference in its entirety. Priority to U.S. Provisional Patent Application Ser. No. 62/617,505 is hereby claimed.

FIELD OF THE DISCLOSURE

This disclosure relates generally to audience measurement and, more particularly, to campaign mapping total audience measurement.

BACKGROUND

Audience measurement of media (e.g., content and/or advertisements presented by any type of medium, such as television, in theater movies, radio, Internet, etc.) is typically carried out by monitoring media exposure of panelists that are statistically selected to represent particular demographic groups. Audience measurement companies enroll households and persons to participate in measurement panels. By enrolling in these measurement panels, households and persons agree to allow the corresponding audience measurement company to monitor their exposure to information presentations, such as media output via a television, a radio, a computer, a smart device, etc. Using various statistical methods, the collected media exposure data is processed to determine the size and/or demographic composition of the audience(s) for media of interest. The audience size and/or demographic information is valuable to, for example, advertisers, broadcasters, content providers, manufacturers, retailers, product developers and/or other entities. For example, demographic information is a factor in the placement of advertisements, in valuing commercial time slots during a particular program and/or generating ratings for piece(s) of media.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Example methods, apparatus, systems and articles of manufacture (e.g., physical storage media) to implement campaign mapping for audience measurement are disclosed herein. Some example techniques disclosed herein determine duplication factors for total audience ratings by mapping a first campaign for which duplication factors for different possible media platform combinations are unknown to a second campaign for which duplication factors for the different possible media platform combinations are known. Then, in some examples, the duplication factors for the second campaign and total exposure metrics corresponding to each individual media platform for the first campaign are used by a maximum entropy solver to estimate the duplication factors for the first campaign. In some examples, the campaign mapping is performed by (1) using a set of reference campaigns (e.g., including the second campaign) with known personal identification information (PII) and duplication factors for the different possible media platform combinations to develop a model that estimates duplication factors for the different possible media platform combinations from total exposure metrics corresponding to each individual media platform for a given campaign; (2) applying the model to the first campaign for which just the total exposure metrics corresponding to each individual media platform are known to determine first estimates of the duplication factors for the different possible media platform combinations for the first campaign; and (3) using the first estimates of the duplication factors to identify a closest one of the set of reference campaigns (e.g., the second campaign) to represent the first campaign. The examples disclosed herein use these first estimates of the duplication factors to identify an actual reference campaign (e.g., the second campaign) to use as a reference for estimating the final duplication factors for the first campaign (by applying the duplication factors for the identified second campaign and the total exposure metrics corresponding to each individual media platform for the first campaign to a maximum entropy solver).

Examples disclosed herein determine total audience ratings for an advertisement by measuring overlap (e.g., duplication factors) of advertisement exposures across different platform combinations to determine a number of unique individuals exposed to an advertisement. Some campaigns include total audience ratings which are known (e.g, reference media campaigns). However, for other campaigns (e.g., query media campaigns) the advertisement exposure for each individual platform (e.g., television (TV), online (DSK), mobile (MBL), etc.) is known, but duplication across platform combinations (e.g., exposures on TV+DSK, TV+MBL, DSK±MBL, TV+DSK+MBL, etc.) is not known. The examples disclosed herein use the known duplication factors for the available reference media campaigns to create a model that estimates a query media campaign's duplication factors across media platform combinations from just the query media campaign's total exposure ratings for the individual media platforms, and uses the model to identify a particular reference media campaign to map to the query media campaign. The examples disclosed herein, use the duplication factors of the reference media campaign and the total exposure metrics for the query media campaign to estimate (with a max entropy solver) the duplication factors for the query media campaign.

Figure 1:
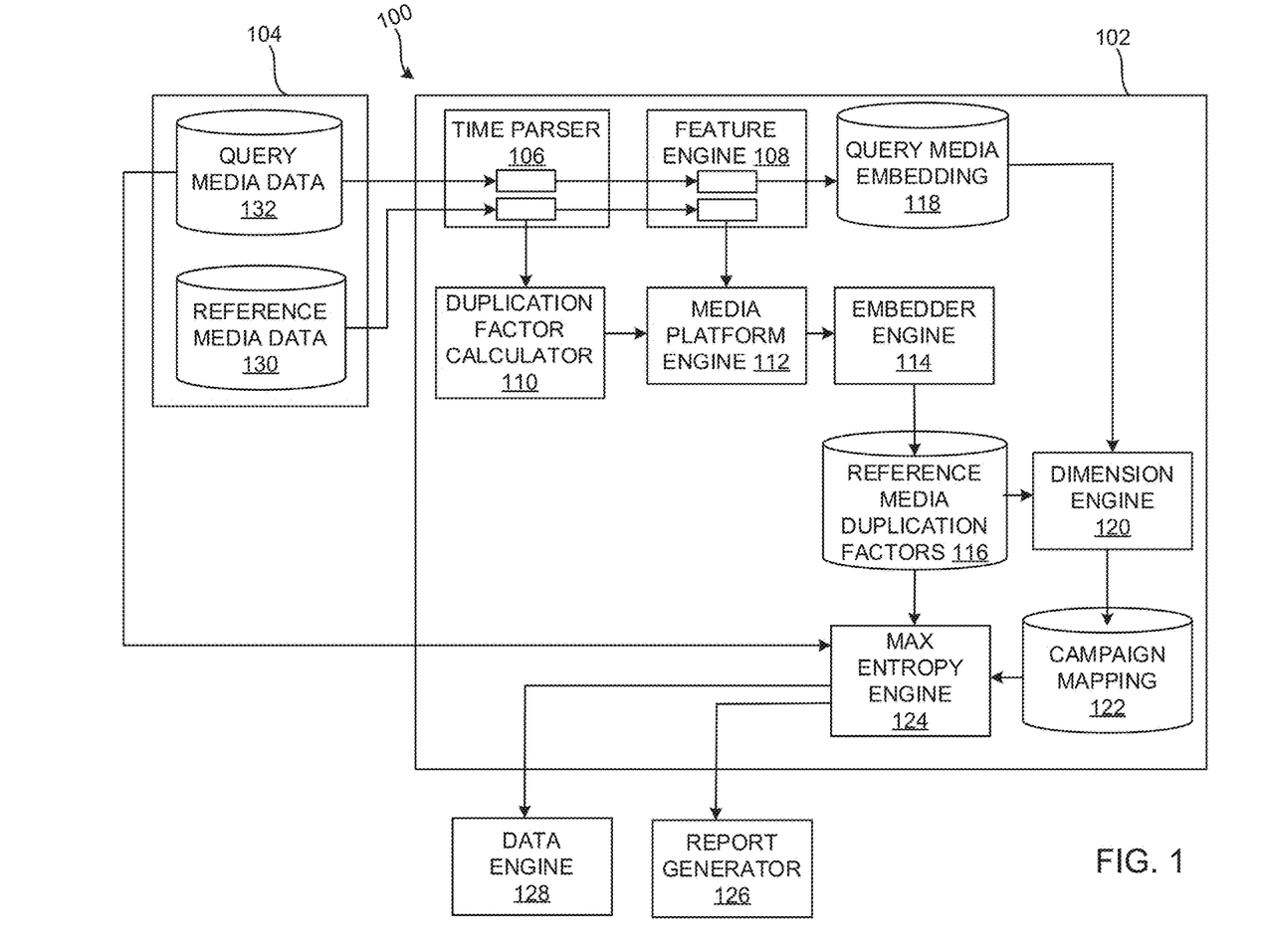
FIG. 1 illustrates an example media monitoring systems structured to implement campaign mapping based on maximum entropy for total audience measurement.

FIG. 1 illustrates an example media monitoring system structured to use media campaign data (e.g., reference media campaign data, query media campaign data, etc.) as disclosed herein to resolve duplication factor errors. As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

As used herein, "media campaign" refers to content and/or advertisements presented by any type of medium, such as television, in theater movies, radio, Internet, etc. during a specified period of time. Reference media campaign data provides a holistic view of an advertisement campaign's audience across media platforms. At its core, reference media campaign data combines TV exposure for a given panelist to their full digital consumption. Establishing this direct observation of TV and digital exposure per person provides the ability to categorize consumers based on the type and number of platforms in which they were exposed to a given campaign. This consumer level exposure across TV and digital platforms grants the ability to deduplicate audiences and calculate unique audience metrics at a platform level per campaign. These unique audience metrics create the holistic view of a campaign's audience and allow clients to truly understand the "total audience" of a given campaign.

Reference media campaign data that effectively combines TV and digital exposures together at a consumer level typically satisfies at least one of two conditions: (1) A single source panel exists, and/or (2) personal identifiable information (PII) for each panelist is accessible within each reference media campaign dataset (i.e. the TV and digital datasets). This information is used to uniquely identify a specific individual across/within datasets and can provide a robust list of linking variables between datasets.

One example manner in which to measure reference media campaigns is through a single source panel, in which all platforms for a given set of individuals are metered. This can often cause a large burden on the panelist, so it is rarely available. In some examples, the measurement is done through a partnership with a third party, who uses a cookie based solution to track digital ad exposures. This cookie based tracking, along with a traditional TV panel, can be used to create a single source panel. A set of personally identifiable information is used to find the mapping between a panelist's platform and a cookie being tracked by the third party, thereby creating a unified measurement across all platforms.

Examples disclosed herein utilize the available TV and digital exposure data for the given market in question, as well as a reference media campaign market's deduplicated audience data. For convenience, the market in question be referred to as the "query media campaign." Examples disclosed herein map a given query media campaign to a reference media campaign. This reference media campaign may also be referred to as a surrogate (or donor) campaign. Once this reference media campaign has been selected, the known deduplicated audience data for this reference media campaign is adjusted to match the overall TV and digital exposure metrics (referred to as "total exposure metrics") for the given query media campaign. This entire end-to-end process is what is referred to as the maximum entropy solution.

FIG. 1 is a schematic illustration of an example environment 100 constructed in accordance with the teachings of this disclosure to implement campaign mapping for total audience measurement. The illustrated example includes an example machine learning engine 102, an example audience measurement entity database 104, an example report generator 126, and an example data engine 128. In the illustrated example, the machine learning engine 102 includes an example time parser 106, an example feature engine 108, an example duplication factor calculator 110, an example media platform engine 112, an example embedder engine 114, an example reference media duplication factors database 116, an example query media embedding database 118, an example dimension engine 120, an example campaign mapping database 122, an example max entropy engine 124. In the illustrated example, the example audience measurement entity database 104 includes an example reference media data database 130, and an example query media data database 132.

In the illustrated example of FIG. 1, the example machine learning engine 102 is trained on the data from the audience measurement entity database 104 to predict sets of estimated duplication factors that represent duplicated media exposure across different possible combinations of media platforms (e.g., television, mobile, online, etc.) for different reference media campaigns. The example machine learning engine 102 is trained to predict the sets of estimated duplication factors for the different reference media campaigns from sets of total exposure metrics for the different reference media campaigns from the audience measurement entity database 104. In some examples, the sets of total exposure metrics represent total media exposure associated with individual media platforms (e.g., television, mobile, online, etc.) for the different reference media campaigns. In some example, the machine learning engine 102 is trained based on the total exposure metrics to predict the corresponding sets of actual duplication factors obtained from the audience measurement entity database 104 for the different reference media campaigns (and which are known and, thus, can be used to train the machine learning engine 102).

After training, the example machine learning engine 102 operates on an input set of total exposure metrics associated with individual media platforms for a query media campaign to predict a first set of estimated duplication factors for different possible combinations of media platforms for the query media campaign, which is described in more detail below. In some examples, the machine learning engine 102 identifies a first set of reference media campaigns to represent the query media campaign based on comparisons of the first set of estimated duplication factors predicted for the query media campaign with respective ones of the sets of actual duplication factors obtained for the respective ones of the reference media campaigns. The machine learning engine 102 subsequently estimates a second set of estimated duplication factors for the query media campaign based on the set of actual duplication factors for the first one of the set of reference media campaigns and the input set of total exposure metrics for the query media campaign.

In the illustrated example of FIG. 1, training of the machine learning engine 102 includes transforming the sets of total exposure metrics and the sets of actual duplication factors to create a first reference media estimated duplication factor for a first combination of media platforms. In some examples, the first reference media estimated duplication factor is specific to a feature combination for the first combination of media platforms. For example, for a first media platform combination of TV and desktop with a feature combination of 1) demographics and 2) an advertisement (e.g., media campaign), an estimated duplication factor may be created via training of the machine learning engine 102. In some examples, the machine learning engine 102 transforms the sets of total exposure metrics and the sets of actual duplication factors to create a second reference media estimated duplication factor for a second combination of media platforms. The second reference media estimated duplication factor has the same feature combination as the first reference media estimated duplication factor.

To transform the sets of total exposure metrics and the sets of actual duplication factors to create the first and second reference media estimated duplication factors, the example machine learning engine 102 includes the time parser 106, the feature engine 108, the duplication factor calculator 110 and the media platform engine 112. In the illustrated example, the time parser 106 receives the sets of total exposure metrics and the sets of actual duplication factors for different reference campaigns from the reference media data database 130. To normalize durations of different reference media campaigns so their data can be combined, the time parser 106 linearly interpolates the reference media campaigns to correspond to the same time period (e.g., days, weeks, months, etc.). For example, the time parser 106 linearly interpolates the sets of total exposure metrics and the sets of actual duplication factors to correspond to three time points (e.g., ⅓ of the way through completion, ⅔ of the way through completion, and 3/3 of the way through completion). As such, the reference media campaign data is now on a common scale regardless of the initial campaign duration which can now be utilized in further processing to mitigate inconsistencies among the media campaigns.

For example, consider an example reference media campaign (referenced as "Cmp X") that has a duration of 5 days, and has the duplication factors and total exposure metrics provided in the tables below:

| Reference Media Campaign ID | Date | Total Exposure Metrics | Percent Complete |
|---|---|---|---|
| Cmp X | 2017 Jan. 1 | 0.1 | 0.2 |
| Cmp X | 2017 Jan. 2 | 0.15 | 0.4 |
| Cmp X | 2017 Jan. 3 | 0.2 | 0.6 |
| Cmp X | 2017 Jan. 4 | 0.25 | 0.8 |
| Cmp X | 2017 Jan. 5 | 0.4 | 1.0 |

| Reference Media Campaign ID | Date | Duplication Factor | Percent Complete |
|---|---|---|---|
| Cmp X | 2017 Jan. 1 | 0.30 | 0.2 |
| Cmp X | 2017 Jan. 2 | 0.35 | 0.4 |
| Cmp X | 2017 Jan. 3 | 0.40 | 0.6 |
| Cmp X | 2017 Jan. 4 | 0.40 | 0.8 |
| Cmp X | 2017 Jan. 5 | 0.42 | 1.0 |

In the illustrated tables, "Total Exposure Metrics" refers to the overall (or total) exposures across all available platforms (e.g., TV, Desktop, mobile, etc.), "Duplication Factor" refers to the granular, deduplication rates between platforms (e.g., TV, Desktop, mobile, etc.), and "Percent Complete" refers to the percentage of completion at any given time for a single campaign. For example, if a campaign runs for 5 days, day 1 will have a percent complete=0.2 (⅕)=20%, day 2 will have a percent complete=0.4 (⅖)=40%, etc. The time parser 106 linearly interpolates the above tables at the determined time periods (⅓, ⅔, and 3/3) to produce the common scale tables below.

| Reference Media Campaign ID | Total Exposure Metrics | Percent Complete |
|---|---|---|
| Cmp X | 0.133333 | 0.333333 |
| Cmp X | 0.216667 | 0.666667 |
| Cmp X | 0.400000 | 1.000000 |

| Reference Media Campaign ID | Duplication Factor | Percent Complete |
|---|---|---|
| Cmp X | 0.333333 | 0.333333 |
| Cmp X | 0.400000 | 0.666667 |
| Cmp X | 0.420000 | 1.000000 |

The common scale table of the reference media campaign's total exposure metrics is utilized by the feature engine 108 to engineer feature combinations. Additionally or alternatively, the common scale table of the reference media campaign's duplication factors is utilized by the duplication factor calculator 110 to estimate duplication factors.

The example feature engine 108 analyzes the common scale total exposure metrics to engineer feature combinations for media platform combinations. Example model features include, but are not limited to: demographics, (gender×age groups); Campaign time steps, (e.g., normalized to the common scale of ⅓, ⅔, 1); TV reach; DSK reach; MBL reach; Digital duplicated reach, which is calculated as: $Digital_{dup} = DSK_{reach} + MBL_{reach} - Digital_{reach}$. For example, the feature engine 108 may analyze the common scale total exposure metrics to determine a feature combination that represents at least one of demographics, a media campaign time step, a media platform reach, or a digital duplicated reach, the digital duplicated reach determined based on a combination of desktop reach, mobile reach, and digital reach for a particular media platform combination. That is, the feature engine 108 analyzes the individual features of each media platform and removes any features that are not common to both media platforms that are to be combined. For example, a mobile platform may include two features (e.g., demographics and a media campaign time step) while a desktop platform only includes demographics. The feature engine 108 engineers a feature combination for the mobile/desktop combination that includes only demographics (e.g., removes the media campaign time step) because the desktop platform does not include the time step feature of the mobile platform. That is, the feature engine 108 identifies features common to both the query media campaign and the reference media campaign to mitigate which may result from combing features that do not exist within a query media campaign.

To estimate the duplication rates for media platform combinations, the duplication factor calculator 110 determines total rates for each platform utilizing the below equations.

The duplication factor calculator 110 determines a respective duplication rate for each platform as in a manner consistent with Equation 1.

$$TV_{total} = TV_{only} + (TV \cap DSK) + (TV \cap MBL) + (TV \cap DSK \cap MBL)$$

$$DSK_{total} = DSK_{only} + (TV \cap DSK) + (DSK \cap MBL) + (TV \cap DSK \cap MBL)$$

$$MBL_{total} = MBL_{only} + (TV \cap MBL) + (DSK \cap MBL) + (TV \cap DSK \cap MBL) \quad \text{(Equation 1)}$$

In the illustrated example of Equation 1, $\cap$ represents the intersection between to platforms. For example, the total TV duplication rate ($TV_{total}$) is determined by combining the TV only duplication rate with 1) the intersection between the duplication rates of TV and DSK, 2) the intersection between the duplication rates of TV and MBL, and 3) the intersection between the duplication rates of TV, DSK, and MBL. The duplication factor calculator 110 determines unions ($\cup$) for media platform combinations in a manner consistent with Equation 2.

$$(TV \cup DSK) = TV_{only} + DSK_{only} + (TV \cap MBL) + (TV \cap DSK) + (DSK \cap MBL) + (TV \cap DSK \cap MBL)$$

$$(TV \cup MBL) = TV_{only} + MBL_{only} + (TV \cap MBL) + (TV \cap DSK) + (DSK \cap MBL) + (TV \cap DSK \cap MBL) \quad \text{(Equation 2)}$$

The duplication factor calculator 110 determines the estimated duplication factors for the media platform combinations in a manner consistent with Equation 3.

$$(TV+DSK)_{dup} = (TV_{total} + DSK_{total} - (TV \cup DSK)) \div (TV \cup DSK)$$

$$(TV+MBL)_{dup} = (TV_{total} + MBL_{total} - (TV \cup MBL)) \div (TV \cup MBL) \quad \text{(Equation 3)}$$

The resulting duplication factors for the media platform combinations are utilized by the media platform engine 112 to build media platform combination models.

To build the media platform combination models, the media platform engine 112 obtains the duplications factors for the media platform combination and identifies the duplication factors as one model input (e.g., a y-variable), and obtains the feature combination from the feature engine 108 and identifies the feature combination as another model input (e.g., an x-variable). The media platform engine 112 subsequently builds models for each media platform combination. For example, the media platform engine 112 builds a Random Forests Regression model for each media platform combination. The example Random Forests Regression models can be interpreted as a collection of decision trees, in which all trees are different from each other, yet each tree performs at making predictions. The word "random" in its name comes from injecting randomness in building different decision trees. When compared to a single decision tree, this method can reduce the amount of overfitting by averaging the results over all trees.

To assess the model fit, the media platform engine 112 performs a K-fold cross validation (where K is a user-specified number). When performing this method, the media platform engine 112 partitions the data into approximately K equal parts, then the media platform engine 112 applies a sequence of models, which use the first K−1 partitions as training sets and Kth partition as a test set. The model accuracy is evaluated on the Kth partition. The resulting media platform combination models are transmitted to the embedder engine 114.

To generate the reference media duplication factors, the embedder engine 114 combines the media platform combination models from the media platform engine 112. The resulting reference media duplication factors are stored in the reference media duplication factors database 116.

After the reference media data has been prepared, the query media data is subsequently processed. The time parser 106 receives the query media data (e.g., a query media campaign) from the query media data database 132. The time parser 106 linearly interpolates the query media campaign to correspond to the same time period (e.g., days, weeks, months, etc.) as the reference media campaigns. For example, the time parser 106 linearly interpolates the sets of total exposure metrics for the query media campaign to correspond to three (or some other number of) time points (e.g., ⅓ of the way through completion, ⅔ of the way through completion, and 3/3 of the way through completion). As such, the query media campaign data is now on a common scale similar to the reference media campaign data regardless of the initial campaign duration.

The example feature engine 108 processes the query media campaign to engineer features similar to the reference media campaign. That is, the feature engine 108 analyzes the features of the query media campaign to identify features that correspond to the features of the reference media campaigns. If the feature engine 108 does not identify any similar features, the process ends because the resulting errors of the process would be too large to compensate for. The resulting model is stored in the query media database 118.

Once the reference media campaign data and the query media campaign data have been processed, the dimension engine 120 combines the two resulting models using a KD tree method. The KD tree can be interpreted as a method to find the neighboring points by using a binary tree, where each node in a tree splits a hyperplane that divides the corresponding dimension into half spaces. At each level of the tree, all data points are allocated along a specific half spaces by a hyperplane that is perpendicular to the corresponding axis.

For example in two dimensional data, as in (x,y) space, the dimension engine 120 builds a KD tree by:

First, choosing a partitioning line perpendicular to the first dimension (x) that passes through the median point of x values. Now, the data points are allocated into two partitions (see line at x=7 in FIG. 3).

Second, choosing a partitioning line perpendicular to the second dimension (y) for each partition that is created in the previous step. Now, the data points are allocated into four partitions (see lines at y=4 and y=6 in FIG. 3).

Figure 3:
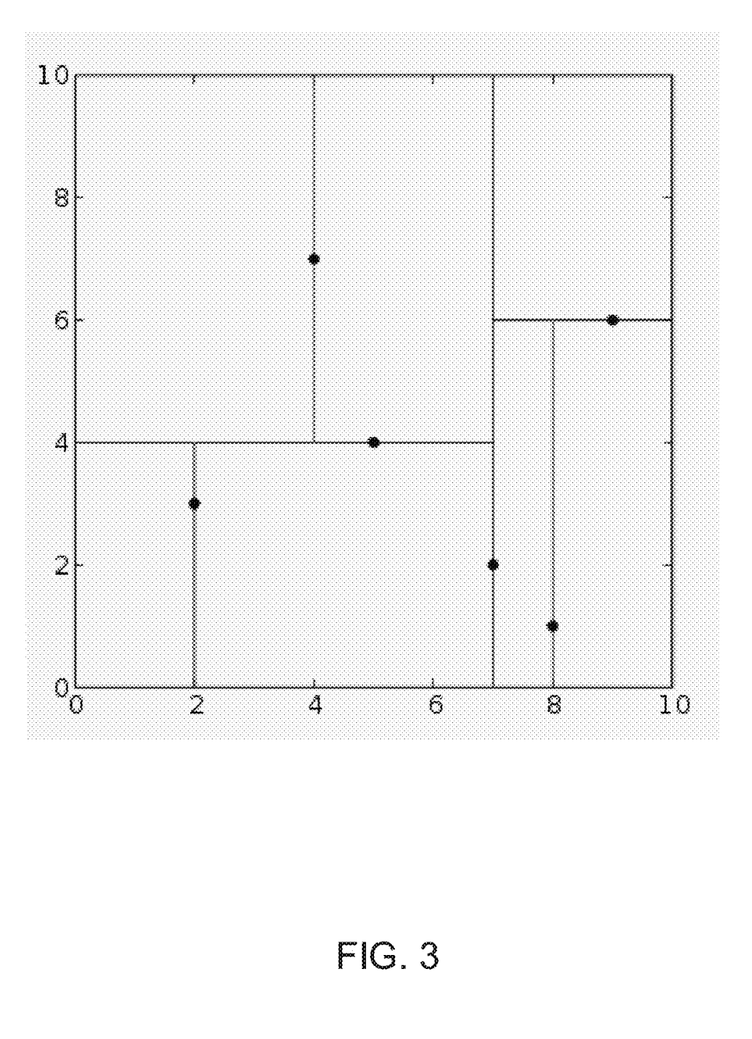
FIG. 3 illustrates example processing methods performed by the example media monitoring system of FIG. 1.

The dimension engine 120 repeats the process by alternating these two steps until all points are exhausted (see lines at x=2, x=4, and x=8 in FIG. 3).

The campaign mapping technique described above uses the models from the reference media duplication factors database to develop the KD tree. In the illustrated example, the tree is built on 23-demo groups×3-time steps×2 predicted duplicated rates for each campaign. Thus, in such an example, each campaign can be represented by a 1-D array of 23×3×2=138 values. Models from the query media database 118 for the query media campaigns are then interpose onto the created tree (where each query media campaign is similarly defined by the 23-demo groups×3-time steps×2-predicted rates). The dimension engine 120 utilizes the Euclidean distance to obtain the nearest neighbor between the tree's data points and the query media campaign's data points.

Consider the following example. Note, for simplicity only 3 values are used to represent a single campaign, whereas in the example above, each campaign would be represented by 138 values as described above.

Reference Media Campaign Models

| Campaign ID | Percent Complete | Duplication Rate |
|---|---|---|
| Cmp A | 0.333333 | 0.1 |
| Cmp A | 0.666667 | 0.2 |
| Cmp A | 1.000000 | 0.3 |
| Cmp B | 0.333333 | 0.4 |
| Cmp B | 0.666667 | 0.5 |
| Cmp B | 1.000000 | 0.6 |
| Cmp C | 0.333333 | 0.7 |
| Cmp C | 0.666667 | 0.8 |
| Cmp C | 1.000000 | 0.9 |

Query Media Campaign in Question

| Campaign ID | Percent Complete | Duplication Rate |
|---|---|---|
| Cmp Q | 0.333333 | 0.15 |
| Cmp Q | 0.666667 | 0.17 |
| Cmp Q | 1.000000 | 0.25 |

The tables above represent a simplified example of how a KD tree determines a reference media campaign (Cmp A) from a number of potential reference media campaigns (Cmp A, Cmp B, Cmp C) for a given query media campaign (Cmp Q) using the Euclidean distance. For example, the reference media campaign table illustrates a list of potential reference media campaigns to consider that could be mapped to the query media campaign in question (Cmp Q). The query media campaign table illustrates the recipient query media campaign (Cmp Q) that is to be mapped to one of the potential reference media campaigns in the reference media campaign table. For simplicity, only 3 values are used to represent a single campaign in the example tables above (while any number of values could be utilized to represent a campaign). In some examples, the values in the tables above represent a campaign's values for one demographic group and one predicted duplication rate at the three time steps. When comparing Cmp Q (query media campaign) to all other reference media campaigns (Cmp A, Cmp B, Cmp C), the closest reference media campaign based on the Euclidean distance is Cmp A as shown by the following calculations:

Cmp Q vs Cmp A:

$d=0.076811$

For:

$(X_1,Y_1,Z_1)=(0.15,0.17,0.25)$ $(X_2,Y_2,Z_2)=(0.1,0.2,0.3)$ $d=\sqrt{(0.1-0.15)^2+(0.2-0.17)^2+(0.3-0.25)^2}$ $d=\sqrt{(-0.05)^2+(0.03)^2+(0.05)^2}$ $d=\sqrt{0.0025+0.0009+0.0025}$ $d=\sqrt{0.0059}$ $d=0.076811$ Cmp Q vs Cmp B:

$d=0.542125$

For:

$(X_1,Y_1,Z_1)=(0.15,0.17,0.25)$ $(X_2,Y_2,Z_2)=(0.4,0.5,0.6)$ $d=\sqrt{(0.4-0.15)^2+(0.5-0.17)^2+(0.6-0.25)^2}$ $d=\sqrt{(0.25)^2+(0.33)^2+(0.35)^2}$ $d=\sqrt{0.0625+0.1089+0.1225}$ $d=\sqrt{0.2939}$ $d=0.542125$ Cmp Q vs. Cmp C:

$d=1.059198$

For:

$(X_1,Y_1,Z_1)=(0.15,0.17,0.25)$ $(X_2,Y_2,Z_2)=(0.7,0.8,0.9)$ $d=\sqrt{(0.7-0.15)^2+(0.8-0.17)^2+(0.9-0.25)^2}$ $d=\sqrt{(0.55)^2+(0.63)^2+(0.65)^2}$ $d=\sqrt{0.3025+0.3969+0.4225}$ $d=\sqrt{1.1219}$ $d=1.059198$ In the above example, the query media campaign (Cmp Q) is mapped to the reference media campaign (Cmp A) from the reference media market as it has a smaller Euclidean distance to the query media campaign than the other reference campaigns (Cmp B and Cmp C). In some examples, the KD Tree method used by the dimension engine 120 in the campaign mapping technique internally limits the search space to those reference media campaigns that are within a threshold Euclidean distance to the provided query media campaign. Then, the Euclidean distance is calculated between the remaining reference media campaigns within the threshold Euclidian distance and the provided query media campaigns. Finally, the closest reference media campaign in this limited search space is chosen as the reference media campaign for the query media campaign provided. The campaign mapping is subsequently stored in the campaign mapping database 122.

Once a query media campaign has been mapped to a reference media campaign, the max entropy engine 124 obtains the query media campaign's corresponding total exposure metrics from the query media data database 132, the reference media campaign's corresponding duplication factors from the reference media duplication factors and/or the reference media data database 130, and the corresponding campaign mapping from the campaign mapping database 122. In the illustrated example, these values are collected from the original datasets (i.e. they are not the total exposure metrics or duplication factors that have been sampled at the ⅓, ⅔, and 3/3 completion level). Rather, they are the original values from the query media campaign and the reference media campaign. The max entropy engine 124 processes the collected data to determine the deduplication audience for the query media campaign. If the query media campaign and its mapped reference media campaign have differing durations, the max entropy engine 124 linearly interpolates the reference media campaign to align with the query media campaign's duration.

In some examples, the duplication factors from the reference media campaign cannot be used directly for the query campaign because doing so would cause resulting audience metrics estimated for the query campaign to be produced with illogical trends, inconsistent volumetrics, and/or an audience which is not reflective of the actual query media campaign's performance. In order to overcome this issue, in some examples, the max entropy engine 124 utilizes numeric optimization techniques to ensure that any estimates that are produced satisfy a set of requirements.

In such examples, the max entropy engine 124 formalizes what requirements are to be satisfied. For example, the max entropy engine 124 may determine that there are 3 types of requirements to be satisfied by the final set of estimated duplication factors determined for the query campaign from the selected reference campaign's duplication factors: consistent requirements, logical requirements, and deviation requirements. The consistent requirements ensure that the estimated duplication factors for the query campaign "add up" to the total exposure metrics. The logical requirements ensure that the estimated duplication factors for the query campaign are self-consistent. The deviation requirements ensures that the estimated duplication factors for the query campaign are as close to the duplication factors from the reference media campaign as possible.

In some examples, the consistent requirements can be most easily expressed in the form Ax=b, where x is a vector of size $2^n$, where n is the number of different combinations of the media platforms being considered (i.e. TV-only, TV+MBL only, TV+MBL+DSK, etc). b is a vector containing the marginal estimated duplication factors (e.g., total exposure metrics) produced by other platforms (i.e. TV reach, desktop reach, mobile reach, and total digital reach). A is a matrix containing 1s or 0s, which indicates which audience segments correspond to which of the marginal estimated duplication factors produced in other platforms. For a solution to be consistent with other estimated duplication factors, the linear system Ax=b provides the corresponding constraint to be satisfied.

The logical requirements serve to ensure that the estimated duplication factors are self-consistent. For example, no media platforms can be less than zero, or greater than 100% of the universe estimate. As another example, the estimated duplication factors should be consistent on a day over day basis. In simple terms, this requirement prevents results that allow an individual to "unsee" an advertisement already seen on a given platform. This includes creating a lower bound and upper bound on each day's media platform which is dependent on the previous day's estimates and the incremental change for each marginal.

The lower bounds for each estimate (e.g., estimated duplication factor) are as follows: Each estimate is to be greater than or equal to 0; TV+DSK may only decrease by at most the incremental change in the MBL marginal; TV+MBL may only decrease by at most the incremental change in the DSK marginal; MBL+DSK may only decrease by at most the incremental change in the TV marginal; TV+MBL+DSK may not decrease.

The upper bounds used are as follows: Each estimate is to be less than or equal to 100% of the universe estimate; TV-only may only increase by at most the incremental change in the TV marginal; DSK-only may only increase by at most the incremental change in the DSK marginal; MBL-only may only increase by at most the incremental change in the MBL marginal; TV+DSK may only increase by at most the sum of incremental changes in TV and DSK; TV+MBL may only increase by at most the sum of incremental changes in TV and MBL; MBL+DSK may only increase by at most the incremental change in the total digital marginal; No-exposure may not increase.

These represent an example set of constraints in order to ensure that the exposure group estimates are self-consistent.

The consistent and logical requirements may allow for infinitely many solutions. In order to choose which of those infinitely many solutions is to be used, a metric measuring how good or bad a solution is can be defined. In some examples, the metric that is used is the cross-entropy between the media platforms of the reference media campaign and the campaign in the query media campaign. The selected solution is one which reduces (e.g., minimizes) the cross-entropy of these two sets of audience segments.

Since the reference media campaign and query media campaign can be different lengths, as discussed previously, for this step, the max entropy engine 124 linearly interpolates the reference media campaign to be aligned with the query media campaign. If for example, the reference media campaign lasted only 5 days, but the query media campaign lasted 10 days, the reference media campaign is linearly interpolated to 10% completion, 20% completion, 30%, etc. (as described above).

Next, with all the requirements for a valid and "ideal" set of audience estimates enumerated, the max entropy engine 124 utilizes numeric solvers that optimize the dual and minimize the duality gap.

The maximum entropy solution described above produces a comprehensive campaign audience view in markets where the necessary marginals exists, but the underlying requirements for reference media markets are not satisfied. For example, TV reach, desktop reach, mobile reach, and total digital reach exist for a query media campaign, but the PII requirements are not satisfied. Mapping a query media campaign to a reference media market campaign provides a deduplicated reference set of duplication factors to act as a donor for the query media campaign. The resulting deduplicated audience view observed with the estimated deduplication factors for the query media campaign contains a set unique audience metrics at a platform level. With this set of unique audience metrics, a "total audience" of a given query media campaign can be determined.

The example report generator 126 generates a report identifying the total audience determined during processing. For example, the report may include a deduplicated unique audience size for an advertisement of interest. The report generated by the report generator 126 may subsequently be provided to a media campaign provider and/or another interested party. In some examples, the report generator 126 may display the report on a device via a webpage in a first state with a set of options. The example set of options may be selectable by a user to change the state of the display to view different types of information in the report.

In the illustrated example, the output of the max entropy engine 124 is fed into the data engine 128. The data engine 128 further processes the total audience data that has been processed by the max entropy engine 124 to determine audience analytics. The example processes performed by the max entropy engine 124 increase the efficiency of the data engine 128. For example, the processes performed by max entropy engine 124 improve the operating efficiency of the data engine 128. Such processes further increase the computational efficiency of the data engine 128 by removing illogical data that would require additional processing cycles to analyze. As such, the processes performed by the max entropy engine 124 are directed to one or more improvement(s) in the functioning of a computer.

Figure 2:
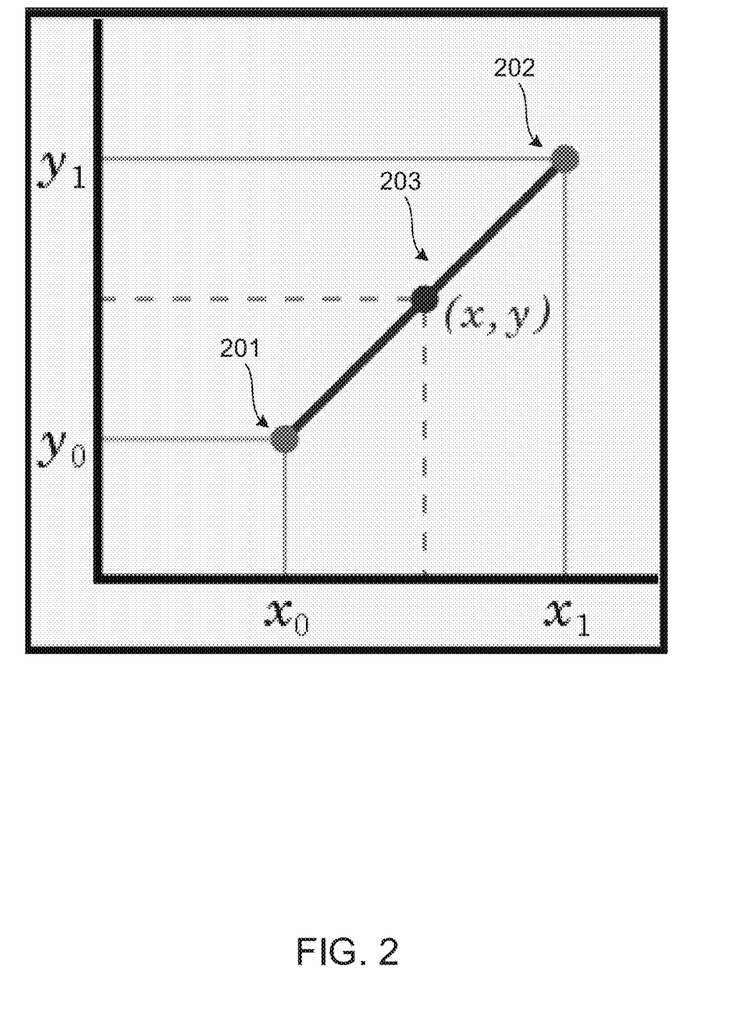
FIG. 2 illustrates example interpolation techniques performed by the example media monitoring system of FIG. 1.

As illustrated in FIG. 2, given two points (201, 202), the line 203 is the linear interpolant between the points 201, 202, and the value of y at x may be found by linear interpolation. In the examples above, the two points 201, 202 represent the (percent complete, data point) values encapsulating the time period in question. The linear interpolation of the data is determined by following the algebraic equations of a line. For example, take the first two rows of the donor campaign's marginal values:

| Donor Campaign ID | Date | Marginal Data | Percent Complete |
| --- | --- | --- | --- |
| Cmp X | 2017 Jan. 1 | 0.1 | 0.2 |
| Cmp X | 2017 Jan. 2 | 0.15 | 0.4 |

Linearly interpolating the donor campaign at ⅓ of completion is described below:
Equation of line $y=mx+b$
Equation of slope $m=(y_2-y_1)/(x_2-x_1)$
Coordinates encapsulating 0.33333 (⅓)=(0.2, 0.1) &. (0.4, 0.15)
Solve for slope (m):

$$m=(y_2-y_1)/(x_2-x_1)$$

$$m=(0.15-0.1)/(0.4-0.2)$$

$$m=0.25$$

Solve for y-intercept (b):

$$y=mx+b$$

$$0.1=(0.25)(0.2)+b$$

$$b=0.05$$

Solve for y (new audience data) at x (0.33333):

$$y=mx+b$$

$$y=(0.25)(0.33333)+0.05$$

$$y=0.133333$$

| Donor Campaign ID | Marginal Data | Percent Complete |
| --- | --- | --- |
| Cmp X | 0.133333 | 0.333333 |

FIG. 3 illustrates an example KD tree constructed in accordance with the description of FIG. 1 to determine a reference media campaign with the shortest Euclidian distance to a query media campaign of interest.

While an example manner of implementing the machine learning engine 102 of FIG. 1 is illustrated in FIG. 1, one or more of the elements, processes and/or devices illustrated in FIG. 1 may be combined, divided, re-arranged, omitted, eliminated and/or implemented in any other way. Further, the example time parser 106, the example feature engine 108, the example duplication factor calculator 110, the example media platform engine 112, the example embedder engine 114, the example dimension engine 120, the example max entropy engine 124, and/or, more generally, the example machine learning engine 102 of FIG. 1 may be implemented by hardware, software, firmware and/or any combination of hardware, software and/or firmware. Thus, for example, any of the example time parser 106, the example feature engine 108, the example duplication factor calculator 110, the example media platform engine 112, the example embedder engine 114, the example dimension engine 120, the example max entropy engine 124, and/or, more generally, the example machine learning engine 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example time parser 106, the example feature engine 108, the example duplication factor calculator 110, the example media platform engine 112, the example embedder engine 114, the example dimension engine 120, and the example max entropy engine 124 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning engine 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
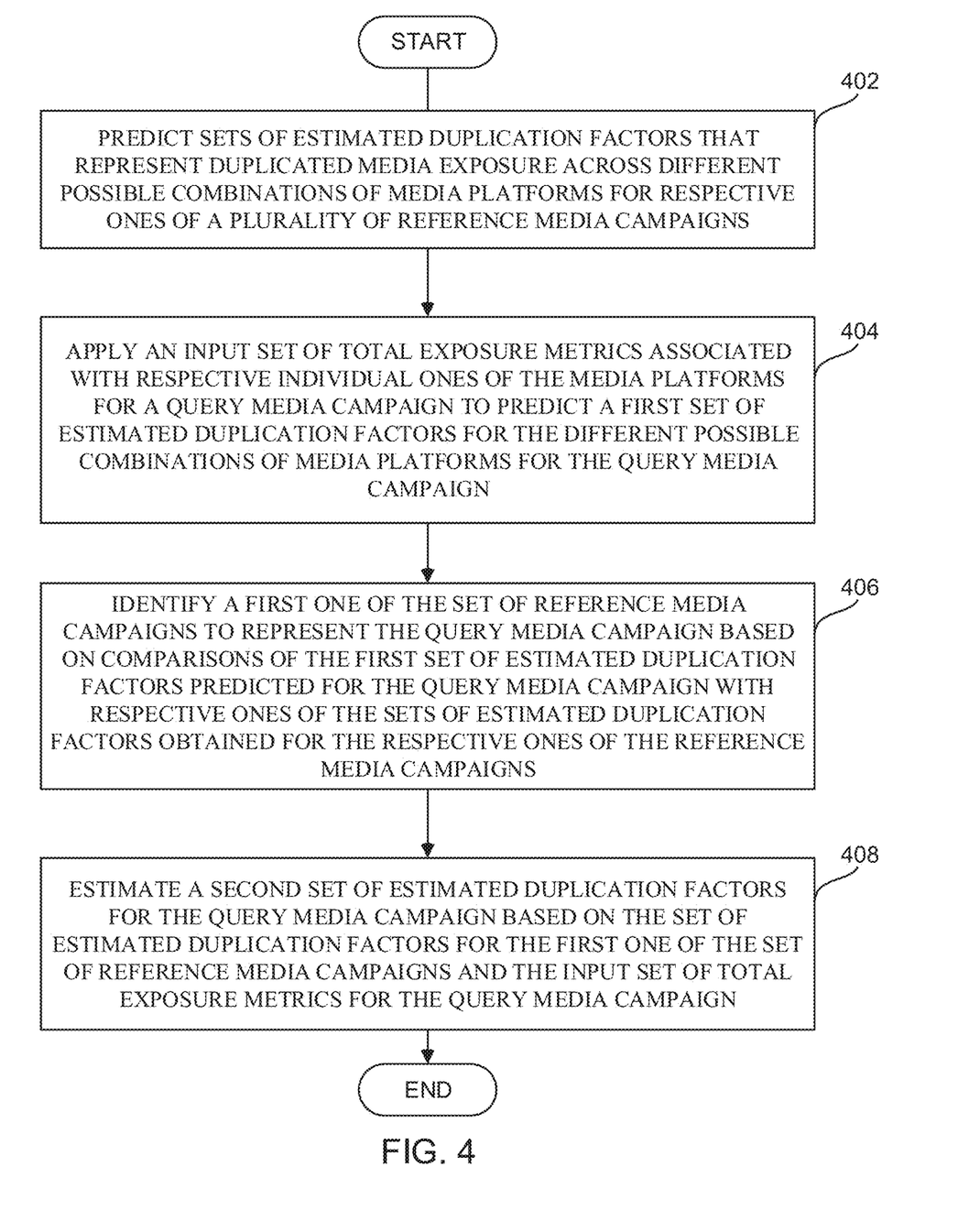
FIG. 4 is an example flowchart representative of example machine readable instructions which may be executed to implement the example media monitoring system of FIG. 1.

A flowchart representative of example hardware logic, machine readable instructions, hardware implemented state machines, and/or any combination thereof for implementing the machine learning engine 102 of FIG. 1 is shown in FIG. 4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example machine learning engine 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example program 400 that may be executed in the example environment 100 of FIG. 1 to leverage the machine learning engine 102 to determine total audience analytics is illustrated in FIG. 4. In the illustrated example of FIG. 4, the machine learning engine 102 is trained to predict sets of estimated duplication factors that represent duplicated media exposure across different possible combinations of media platforms for respective ones of a plurality of reference media campaigns. (block 402). For example, the machine learning engine 102 is trained to predict the sets of estimated duplication factors for the respective ones of the reference media campaigns from sets of total exposure metrics obtained for the respective ones of the reference media campaigns. For example, the sets of total exposure metrics represent media exposure associated with individual ones of the media platforms for the respective ones of the reference media campaigns, and the machine learning engine is trained based on the total exposure metrics to predict the sets of actual duplication factors obtained for the respective ones of the reference media campaigns. At block 404, the machine learning engine 102 operates an input set of total exposure metrics associated with respective individual ones of the media platforms for a query media campaign to predict a first set of estimated duplication factors for the different possible combinations of media platforms for the query media campaign. At block 406, the machine learning engine 102 identify a first one of the set of reference media campaigns to represent the query media campaign based on comparisons of the first set of estimated duplication factors predicted for the query media campaign with respective ones of the sets of estimated duplication factors obtained for the respective ones of the reference media campaigns. At block 408, the machine learning engine 102 estimates a second set of estimated duplication factors for the query media campaign based on the set of estimated duplication factors for the first one of the set of reference media campaigns and the input set of total exposure metrics for the query media campaign. The process 400 ends.

Figure 5:
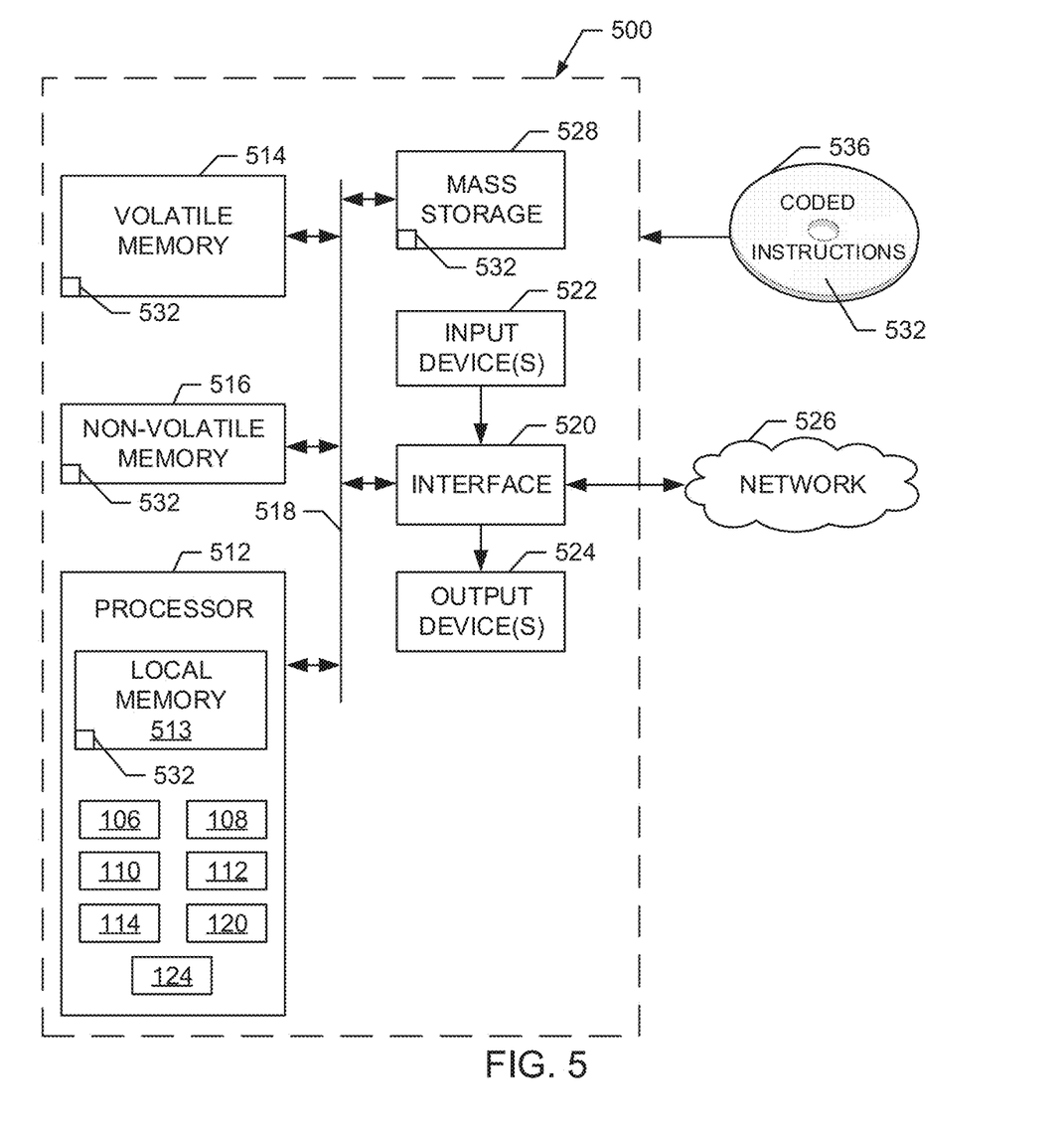
FIG. 5 is a block diagram of an example processor platform structured to execute the instructions of FIG. 4 to implement the example media monitoring system of FIG. 1.

FIG. 5 is a block diagram of an example processor platform 500 structured to execute the instructions of FIG. 4 to implement the machine learning engine 102 of FIG. 1. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example time parser 106, the example feature engine 108, the example duplication factor calculator 110, the example media platform engine 112, the example embedder engine 114, the example dimension engine 120, and the example max entropy engine 124.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that improve the operating efficiency of computing devices by determining total audience data and removing illogical data from subsequent processing. Such disclosed examples increase the computational efficiency of computing systems that determine audience measurement statistics. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
memory; and
a machine learning engine to:
    predict sets of estimated duplication factors that represent duplicated media exposure across different possible combinations of media platforms for respective ones of a plurality of reference media campaigns, the sets of estimated duplication factors corresponding to estimated measures of overlap of media exposure across the different possible combinations of the media platforms for the respective ones of the reference media campaigns, the machine learning engine trained to predict the sets of estimated duplication factors for the respective ones of the reference media campaigns from sets of total exposure metrics obtained for the respective ones of the reference media campaigns, the sets of total exposure metrics to represent media exposure associated with individual ones of the media platforms for the respective ones of the reference media campaigns, the machine learning engine trained based on the sets of total exposure metrics and sets of actual duplication factors obtained for the respective ones of the reference media campaigns, the sets of actual duplication factors different than the sets of estimated duplication factors, the sets of actual duplication factors corresponding to actual measures of overlap of media exposure across the different possible combinations of the media platforms for the respective ones of the reference media campaigns;
    process an input set of total exposure metrics associated with respective individual ones of the media platforms for a query media campaign to predict a first set of estimated duplication factors that represent duplicated media exposure across the different possible combinations of media platforms for the query media campaign, the first set of estimated duplication factors corresponding to estimated measures of overlap of media exposure across the different possible combinations of the media platforms for the query media campaign;
    identify a first reference media campaign of the reference media campaigns to represent the query media campaign based on comparisons of the first set of estimated duplication factors predicted for the query media campaign with respective ones of the sets of estimated duplication factors for the respective ones of the reference media campaigns; and
    estimate a second set of estimated duplication factors for the query media campaign based on the set of estimated duplication factors for the first reference media campaign and the input set of total exposure metrics for the query media campaign, the second set of estimated duplication factors corresponding to estimated measures of overlap of media exposure across the different possible combinations of the media platforms for the query media campaign.

2. The apparatus of claim 1, further including a duplication factor calculator to:
    transform the sets of total exposure metrics and the sets of actual duplication factors to create a first reference media estimated duplication factor for a first combination of media platforms, the first reference media estimated duplication factor associated with a feature combination for the first combination of media platforms; and transform the sets of total exposure metrics and the sets of actual duplication factors to create a second reference media estimated duplication factor for a second combination of media platforms, the second reference media estimated duplication factor associated with the feature combination.

3. The apparatus of claim 2, wherein the feature combination represents at least one of demographics, a media campaign time step, a media platform reach, or a digital duplicated reach, the digital duplicated reach determined based on a combination of desktop reach, mobile reach, and digital reach.

4. The apparatus of claim 2, further including a media platform engine to:

generate a first decision tree model based on the first reference media estimated duplication factor;

generate a second decision tree model based on the second reference media estimated duplication factor; and train the first decision tree model and the second decision tree model using K-fold cross validation.

5. The apparatus of claim 2, further including an embedder engine to transform the query media campaign based on the feature combination associated with the first reference media estimated duplication factor and the second reference media estimated duplication factor to create a query media estimated duplication factor.

6. The apparatus of claim 5, further including a dimension engine to map the query media estimated duplication factor to the first reference media estimated duplication factor and the second reference media estimated duplication factor utilizing a KD tree, and identify the first reference media campaign based on a Euclidean distance to the query media campaign.

7. The apparatus of claim 6, further including a max entropy engine to linearly interpolate the first reference media campaign to match a duration of the query media campaign, and combine the input set of total exposure metrics for the query media campaign and deduplication rates for the linearly interpolated reference media campaign to determine a deduplicated audience for the query media campaign.

8. A non-transitory computer readable medium comprising instructions that, when executed, cause a processor of a machine learning engine to at least:

train the machine learning engine to predict sets of estimated duplication factors that represent duplicated media exposure across different possible combinations of media platforms for respective ones of a plurality of reference media campaigns, the sets of estimated duplication factors corresponding to estimated measures of overlap of media exposure across the different possible combinations of the media platforms for the respective ones of the reference media campaigns, the machine learning engine trained to predict the sets of estimated duplication factors for the respective ones of the reference media campaigns from sets of total exposure metrics obtained for the respective ones of the reference media campaigns, the sets of total exposure metrics to represent media exposure associated with individual ones of the media platforms for the respective ones of the reference media campaigns, the machine learning engine trained based on the sets of total exposure metrics and sets of actual duplication factors obtained for the respective ones of the reference media campaigns, the sets of actual duplication factors different than the sets of estimated duplication factors, the sets of actual duplication factors corresponding to actual measures of overlap of media exposure across the different possible combinations of the media platforms for the respective ones of the reference media campaigns;

process an input set of total exposure metrics associated with respective individual ones of the media platforms for a query media campaign to predict a first set of estimated duplication factors that represent duplicated media exposure across the different possible combinations of media platforms for the query media campaign, the first set of estimated duplication factors corresponding to estimated measures of overlap of media exposure across the different possible combinations of the media platforms for the query media campaign;

identify a first reference media campaign of the reference media campaigns to represent the query media campaign based on comparisons of the first set of estimated duplication factors predicted for the query media campaign with respective ones of the sets of estimated duplication factors for the respective ones of the reference media campaigns; and estimate a second set of estimated duplication factors for the query media campaign based on the set of estimated duplication factors for the first reference media campaign and the input set of total exposure metrics for the query media campaign, the second set of estimated duplication factors corresponding to estimated measures of overlap of media exposure across the different possible combinations of the media platforms for the query media campaign.

9. The non-transitory computer readable medium of claim 8, wherein the instructions further cause the processor of the machine learning engine to:

transform the sets of total exposure metrics and the sets of actual duplication factors to create a first reference media estimated duplication factor for a first combination of media platforms, the first reference media estimated duplication factor associated with a feature combination for the first combination of media platforms; and transform the sets of total exposure metrics and the sets of actual duplication factors to create a second reference media estimated duplication factor for a second combination of media platforms, the second reference media estimated duplication factor associated with the feature combination.

10. The non-transitory computer readable medium of claim 9, wherein the feature combination represents at least one of demographics, a media campaign time step, a media platform reach, or a digital duplicated reach, the digital duplicated reach determined based on a combination of desktop reach, mobile reach, and digital reach.

11. The non-transitory computer readable medium of claim 9, wherein the instructions further cause the processor of the machine learning engine to:

generate a first decision tree model based on the first reference media estimated duplication factor;

generate a second decision tree model based on the second reference media estimated duplication factor; and train the first decision tree model and the second decision tree model using K-fold cross validation.

12. The non-transitory computer readable medium of claim 9, wherein the instructions further cause the processor of the machine learning engine to transform the query media campaign based on the feature combination associated with the first reference media estimated duplication factor and the second reference media estimated duplication factor to create a query media estimated duplication factor.

13. The non-transitory computer readable medium of claim 12, wherein the instructions further cause the processor of the machine learning engine to map the query media estimated duplication factor to the first reference media estimated duplication factor and the second reference media estimated duplication factor utilizing a KD tree, and identify the first reference media campaign based on a Euclidean distance to the query media campaign.

14. The non-transitory computer readable medium of claim 13, wherein the instructions further cause the processor of the machine learning engine to linearly interpolate the first reference media campaign to match a duration of the query media campaign, and combine the input set of total exposure metrics for the query media campaign and deduplication rates for the linearly interpolated reference media campaign to determine a deduplicated audience for the query media campaign.

15. A method comprising:
training, by executing an instruction with a processor, a machine learning engine to predict sets of estimated duplication factors that represent duplicated media exposure across different possible combinations of media platforms for respective ones of a plurality of reference media campaigns, the sets of estimated duplication factors corresponding to estimated measures of overlap of media exposure across the different possible combinations of the media platforms for the respective ones of the reference media campaigns, the machine learning engine trained to predict the sets of estimated duplication factors for the respective ones of the reference media campaigns from sets of total exposure metrics obtained for the respective ones of the reference media campaigns, the sets of total exposure metrics to represent media exposure associated with individual ones of the media platforms for the respective ones of the reference media campaigns, the machine learning engine trained based on the sets of total exposure metrics and sets of actual duplication factors obtained for the respective ones of the reference media campaigns, the sets of actual duplication factors different than the sets of estimated duplication factors, the sets of actual duplication factors corresponding to actual measures of overlap of media exposure across the different possible combinations of the media platforms for the respective ones of the reference media campaigns;
processing, with the machine learning engine, an input set of total exposure metrics associated with respective individual ones of the media platforms for a query media campaign to predict a first set of estimated duplication factors that represent duplicated media exposure across the different possible combinations of media platforms for the query media campaign, the first set of estimated duplication factors corresponding to estimated measures of overlap of media exposure across the different possible combinations of the media platforms for the query media campaign;
identifying, with the machine learning engine, a first reference media campaign of the reference media campaigns to represent the query media campaign based on comparisons of the first set of estimated duplication factors predicted for the query media campaign with respective ones of the sets of estimated duplication factors for the respective ones of the reference media campaigns; and
estimating, with the machine learning engine, a second set of estimated duplication factors for the query media campaign based on the set of estimated duplication factors for the first reference media campaign and the input set of total exposure metrics for the query media campaign, the second set of estimated duplication factors corresponding to estimated measures of overlap of media exposure across the different possible combinations of the media platforms for the query media campaign.

16. The method of claim 15, wherein the training of the machine learning engine includes:
transforming the sets of total exposure metrics and the sets of actual duplication factors to create a first reference media estimated duplication factor for a first combination of media platforms, the first reference media estimated duplication factor associated with a feature combination for the first combination of media platforms; and
transforming the sets of total exposure metrics and the sets of actual duplication factors to create a second reference media estimated duplication factor for a second combination of media platforms, the second reference media estimated duplication factor associated with the feature combination.

17. The method of claim 16, further including:
generating a first decision tree model based on the first reference media estimated duplication factor;
generating a second decision tree model based on the second reference media estimated duplication factor; and
training the first decision tree model and the second decision tree model using K-fold cross validation.

18. The method of claim 16, further including:
transforming the query media campaign based on the feature combination associated with the first reference media estimated duplication factor and the second reference media estimated duplication factor to create a query media estimated duplication factor.

19. The method of claim 18, further including mapping the query media estimated duplication factor to the first reference media estimated duplication factor and the second reference media estimated duplication factor utilizing a KD tree, and identify the first reference media campaign based on a Euclidean distance to the query media campaign.

20. The method of claim 19, wherein the estimating of the second set of estimated duplication factors for the query media campaign includes linearly interpolating the first reference media campaign to match a duration of the query media campaign, and further including combining the input set of total exposure metrics for the query media campaign and deduplication rates for the linearly interpolated reference media campaign to determine a deduplicated audience for the query media campaign.

21. The method of claim 16, wherein the feature combination represents at least one of demographics, a media campaign time step, a media platform reach, or a digital duplicated reach, the digital duplicated reach determined based on a combination of desktop reach, mobile reach, and digital reach.

22. The apparatus of claim 1, wherein the reference media campaigns correspond to campaigns for which the overlap of the media exposure across the different possible combinations of the media platforms is known, and the query media campaign corresponds to a campaign for which the overlap of the media exposure across the different possible combinations of the media platforms is unknown.

* * * * *